US006972824B2

(12) United States Patent
Masutani et al.

(10) Patent No.: US 6,972,824 B2
(45) Date of Patent: Dec. 6, 2005

(54) LIQUID CRYSTAL DISPLAY DEVICE INCLUDING SEPARATING AREAS FOR LINE DISCONNECTION RECOVERY ARRANGED OUTSIDE OVERLAP PORTION OF SOURCE LINE B COMMON ELECTRODE

(75) Inventors: Yuichi Masutani, Kikuchi-gun (JP); Shingo Nagano, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 88 days.

(21) Appl. No.: 10/407,238

(22) Filed: Apr. 7, 2003

(65) Prior Publication Data

US 2003/0193638 A1 Oct. 16, 2003

(30) Foreign Application Priority Data

Apr. 15, 2002 (JP) .............................. 2002-112738

(51) Int. Cl.$^7$ ......................... G02F 1/13; G02F 1/1333; G02F 1/1343
(52) U.S. Cl. .......................... 349/192; 349/40; 349/54; 349/55; 349/141
(58) Field of Search ............................. 349/40, 54, 55, 349/141, 192

(56) References Cited

U.S. PATENT DOCUMENTS

| 5,995,178 | A | * | 11/1999 | Fujikawa et al. ............. 349/55 |
| 6,191,832 | B1 | * | 2/2001 | Nakakura ..................... 349/54 |
| 6,441,401 | B1 | * | 8/2002 | Jung et al. ..................... 257/72 |
| 2001/0002146 | A1 | * | 5/2001 | Komatsu ..................... 349/141 |
| 2002/0047977 | A1 | * | 4/2002 | Lee ........................... 349/141 |

FOREIGN PATENT DOCUMENTS

| JP | 8-254712 | 10/1996 |
| JP | 9-113930 | 5/1997 |

OTHER PUBLICATIONS

M. OH-e, et al., "S23-1 Principles and Characteristics of Electro-Optical Behaviour with in-Plane Switching Mode", Asia Display, 1995, pp. 577-580.

* cited by examiner

Primary Examiner—Tarifur R. Chowdhury
(74) Attorney, Agent, or Firm—Oblon, Spivak, McClelland, Maier & Neustadt, P.C.

(57) ABSTRACT

The present invention relates to a liquid crystal display device of In-Plane Switching mode. The liquid crystal display device includes a common electrode having an overlap portion in which the common electrode is overlapped with a source line. The common electrode has separating areas for line disconnection recovery outside of the overlap portion. The separating areas disconnect the overlap portion from other portion of the common electrode at least between which and a pixel electrode is generated an electric field.

10 Claims, 6 Drawing Sheets

LIQUID CRYSTAL DISPLAY DEVICE
INCLUDING SEPARATING AREAS FOR
LINE DISCONNECTION RECOVERY
ARRANGED OUTSIDE OVERLAP PORTION
OF SOURCE LINE B COMMON
ELECTRODE

BACKGROUND OF THE INVENTION

1. Field of the Invention

The present invention relates to a liquid crystal display device in which line disconnection is easily recovered, and a manufacturing method thereof.

2. Related Background Art

Figure 6A:
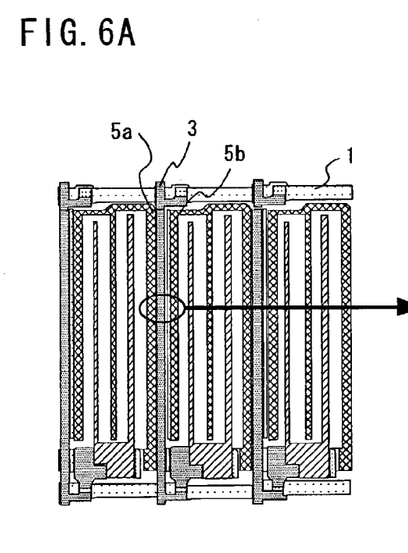
FIGS. 6A and 6B are views to show a pixel area of a conventional liquid crystal display device.
Figure 6B:
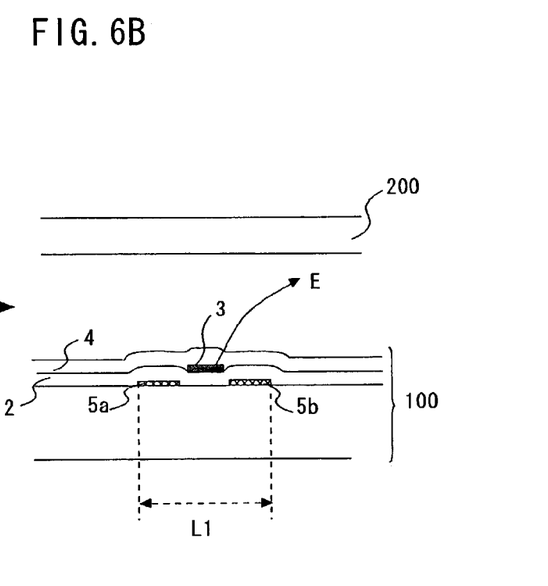

Recently, In-Plane Switching mode in which an electric field parallel to a substrate is applied to liquid crystal is employed in an active matrix liquid crystal display device for obtaining an extremely wide viewing angle, as disclosed in Japanese Patent Application Laid-Open No. H08-254712. In-Plane Switching mode operation minimizes viewing-angle-based gray-scale inversion and deterioration in contrast ratio (reference: M. Oh-e et. al., Asia Display 1995. pp. 577–580). FIG. 6A is a plan view showing a pixel area of a conventional In-Plane Switching mode liquid crystal display device, and FIG. 6B is an enlarged sectional view showing a part of the same. In FIGS. 6A and 6B, reference numeral 100 designates a Thin Film Transistor (TFT) array substrate, and 200, a color filter (CF) substrate. Reference numeral 1 designates a gate line that is a plurality of scanning lines formed on an insulating substrate, 2 a gate insulation film, 3 a source line, 4 an insulation film formed on the source line 3, and 5a and 5b common electrodes formed on the same layer as the gate line 1. As shown in FIG. 6B, the common electrode 5 is separated into the common electrodes 5a and 5b. In this configuration, a voltage applied to the source line generates an electric field E, changing an alignment condition of the liquid crystal placed between the TFT array substrate 100 and the CF substrate 200. Therefore, the width L1 in FIG. 6B has to be wide in the configuration shown in FIGS. 6A and 6B, and light transmission is thus limited, which causes a problem of low aperture ratio.

Figure 7A:
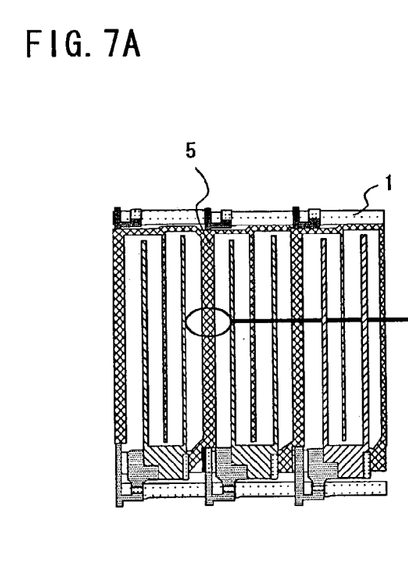
FIGS. 7A and 7B are views to show a pixel area of a conventional liquid crystal display device.
Figure 7B:
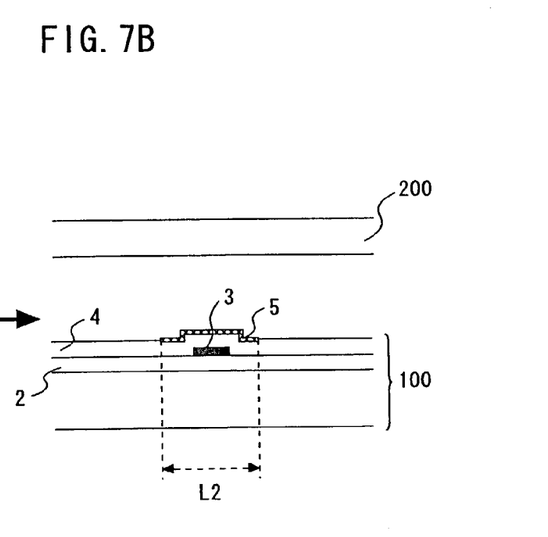

In order to solve the above problem, the configuration shown in FIGS. 7A and 7B has been proposed. In this configuration, the source line 3 and the common electrode 5 are overlapped with each other, the source line 3 covered with the common electrode 5. Therefore, an electric field generated from the source line 3 is blocked by the common electrode 5 not to reach the liquid crystal, thereby reducing change in an alignment condition of the liquid crystal. Accordingly, the width L2 to limit light transmission can be small, thus attaining high aperture ratio.

SUMMARY OF THE INVENTION

Generally, in a liquid crystal display device, disconnection of a source line occurs with a certain probability, causing low yields. The disconnection can occur in the source line 3 in a configuration shown in FIGS. 7A and 7B. For recovering the disconnection, there is such a method to make short-circuit between a disconnected line and the line of an upper layer by a laser, as disclosed in Japanese Patent Application Laid-Open No. H09-113930. However, because source signals are to be transmitted above the common electrode 5, the method of making short-circuit between the source line 3 and the common electrode 5 is not available here.

The present invention has been accomplished to solve the above problem and an object of the present invention is thus to provide a liquid crystal display device having such a structure that disconnection of a source line is easily recovered, and that the recovery of the disconnection results in only small reduction of an area serving for display, not to affect display quality, and a manufacturing method thereof.

A liquid crystal display device according to the present invention is a liquid crystal display device including a common electrode having an overlap portion in which the common electrode is overlapped with a source line, and separating areas for line disconnection recovery outside of the overlap portion, and disconnecting the overlap portion from other portion of the common electrode at least between which and a pixel electrode is generated an electric field. In this configuration, disconnection of the source line overlapped with the common electrode is easily recovered by applying a laser beam to the separating areas for line disconnection recovery.

It is possible that a common capacitor line connected to the common electrode has separating areas for line disconnection recovery disconnecting the overlap portion from other portion of the common electrode at least between which and a pixel electrode is generated an electric field. In this configuration, disconnection of the source line can be recovered using the common electrode connected to the common capacitor line.

The separating areas for line disconnection recovery is preferably not overlapped with other conductive elements including the source line in order to reduce dielectric breakdown risks caused by a laser beam.

In a preferred embodiment, the separating areas for line disconnection recovery has no other conductive element within 4 $\mu$m of the source line. It further reduces dielectric breakdown risks caused by a laser beam.

It is also preferable that a plurality of electrode patterns are provided to connect the common electrode in the overlap portion with the common electrode in an adjoining pixel. The configuration allows recovering the source line disconnection, keeping the connection between the common electrode placed between adjoining pixels by at least one of the plurality of the electrode patterns. The disconnection is therefore recovered without decreasing display quality.

A method of manufacturing a liquid crystal display device according to the present invention is a manufacturing method of a liquid crystal display device including a common electrode having an overlap portion in which the common electrode is overlapped with a source line, and separating areas for line disconnection recovery outside of the overlap portion and disconnecting the overlap portion from other portion of the common electrode at least between which and a pixel electrode is generated an electric field, having when a source line has a disconnected part in the overlap portion, a connecting step of conductively connecting the source line with the common electrode extending over the disconnected part in the overlap portion, and a cutting step of cutting the common electrode at the separating areas for line disconnection recovery. In this method, disconnection of the source line overlapped with the common electrode is easily recovered.

It is preferable that the connecting step applies a laser beam to conductively connecting the common electrode and the source line.

It is also preferable that the cutting step applies a laser beam to cut the common electrode.

A plurality of electrode patterns are preferably provided to connect the common electrode in the overlap portion with the common electrode in an adjoining pixel, and the cutting step cuts one of the plurality of electrode patterns. The configuration allows recovering the source line disconnection, keeping the connection between the common electrode placed between adjoining pixels.

The present invention will become more fully understood from the detailed description given hereinbelow and the accompanying drawings which are given by way of illustration only, and thus are not to be considered as limiting the present invention.

BRIEF DESCRIPTION OF THE DRAWINGS

FIGS. 5A–5E are manufacturing flowcharts of a liquid crystal display device according to the present invention.

DESCRIPTION OF THE PREFERRED EMBODIMENTS

First Embodiment

A basic configuration of a liquid crystal display device according to the present invention has a same configuration of a conventional liquid crystal display device, shown in FIGS. 7A and 7B, for example. More specifically, a color filter (CF) substrate and a thin film transistor (TFT) substrate are placed oppositely at a certain distance away from reach other. A liquid crystal layer is placed between those substrates. A gate line and a source line crossing each other are formed on one of the substrates. There is also formed a switching element such as a thin film transistor connected to the gate line and the source line. Formed in the switching element are a V-shaped comb-type pixel electrode consisting of a plurality of electrodes provided parallel to the source line, and V-shaped comb-type common electrode consisting of a plurality of electrodes arranged parallel to and alternating with the plurality of electrodes of the pixel electrode. Application of a voltage across the pixel electrode and the common electrode results in application of an electric field substantially parallel to the substrates to the liquid crystal layer.

Figure 1:
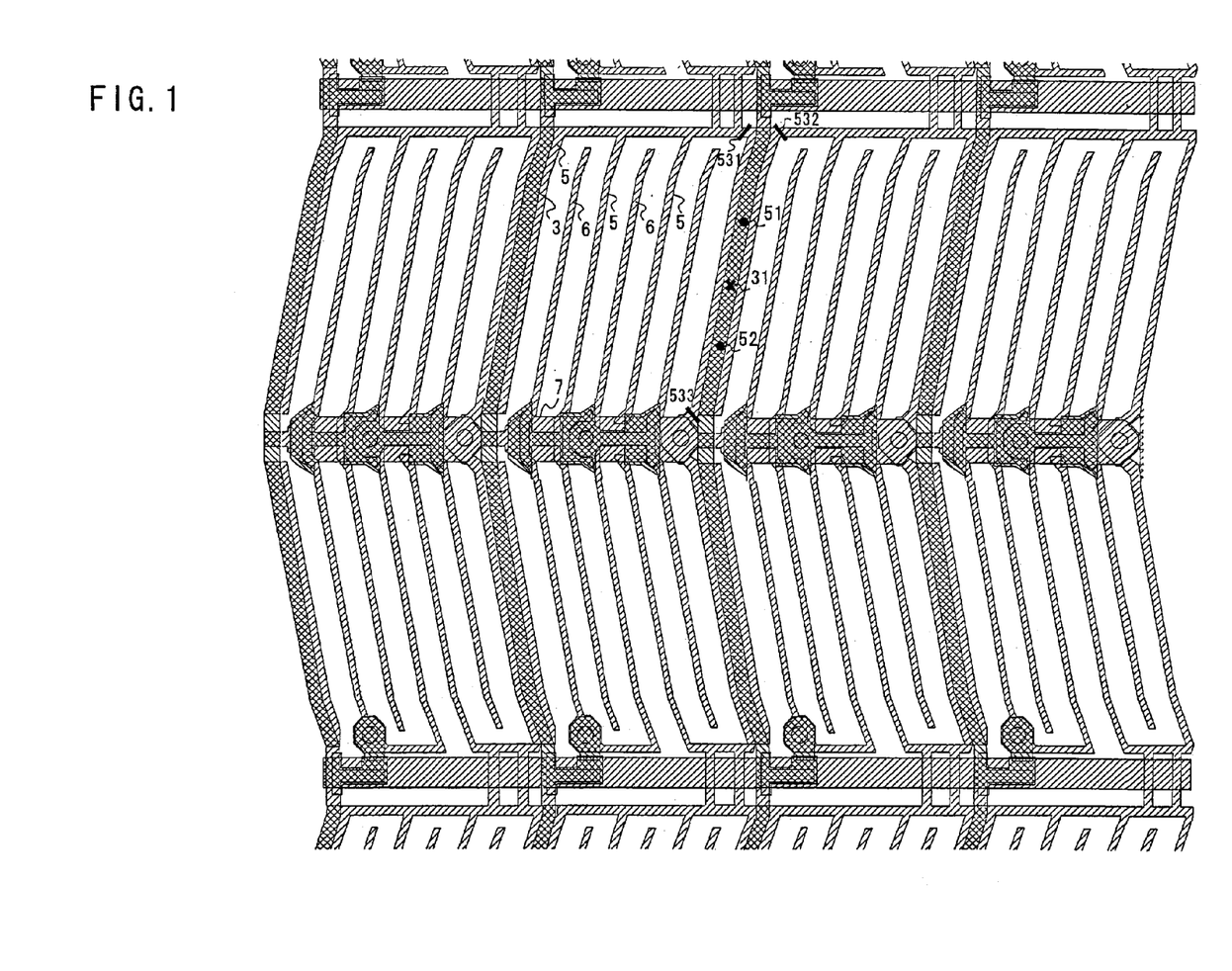
FIG. 1 is a view to show a pixel area of a liquid crystal display device according to the present invention.

FIG. 1 is an enlarged view of a plurality of pixel areas of the liquid crystal display device according to the present invention. In FIG. 1, the same elements as those in FIGS. 6A–6B and 7A–7B are denoted by the same reference numerals and redundant description will be omitted.

In FIG. 1, reference numeral 3 designates a source line lying at a side of a pixel perpendicularly to a direction of an electric field generated between a common electrode 5 and a pixel electrode 6 to be hereinafter described. The source line 3 is 400 nm to 500 nm thick, for example. Reference numeral 5 designates a V-shaped comb-type common electrode, which is also called a counter electrode, consisting of a plurality of electrodes arranged parallel to and alternating with a plurality of electrodes of the pixel electrode 6 to be hereinbelow described. Reference numeral 6 designates a V-shaped comb-type pixel electrode consisting of a plurality of electrodes connected to a thin film transistor and provided parallel to the source line 3, which is formed by metal such as chromium (Cr) or a transparent conductive film such as Indium Tin Oxide (ITO). Reference numeral 7 designates a common capacitor line formed by metal such as chromium (Cr) and connected to the common electrode 5 via a through hole. In this case, the source line 3, the common electrode 5, and the pixel electrode 6 are V-shaped, bent at the middle. The bent portion is in an area of a common capacitor line 7. The zigzag electrode structure drives liquid crystal in two directions, thereby overcoming a problem of reduced viewing angle characteristics in a certain direction in an In-Plane Switching mode liquid crystal panel.

As shown in FIG. 1, the source line 3 and the common electrode 5 provided between pixels adjoining horizontally, which is, in a direction of an electric field, are overlapped with each other. That is, the common electrode 5 covers the source line 3 with an insulation film 4 interposed therebetween.

In the following, the case where a source line 3 is disconnected at an area 31 in a configuration shown in FIG. 1 will be explained. The area 31 is located in an overlap portion of the source line 3 and the common electrode 5 between horizontally adjoining pixels. First, areas 51 and 52 of the common electrode 5 are exposed to a laser beam from a laser at a side of the common electrode 5. The areas 51 and 52 are located in an overlap portion of the source line 3 and the common electrode 5 between horizontally adjoining pixels, and between those areas are the area 31. YAG laser or excimer laser, for example, is used for the laser. Metal in the areas 51 and 52 of the common electrode 5 are thereby molten, and dielectric breakdown occurs in the insulation layer 4 to conductively connect the common electrode 5 with the source line 3. The above recovering process is performed after an array testing process or panel testing process.

Figure 2A:
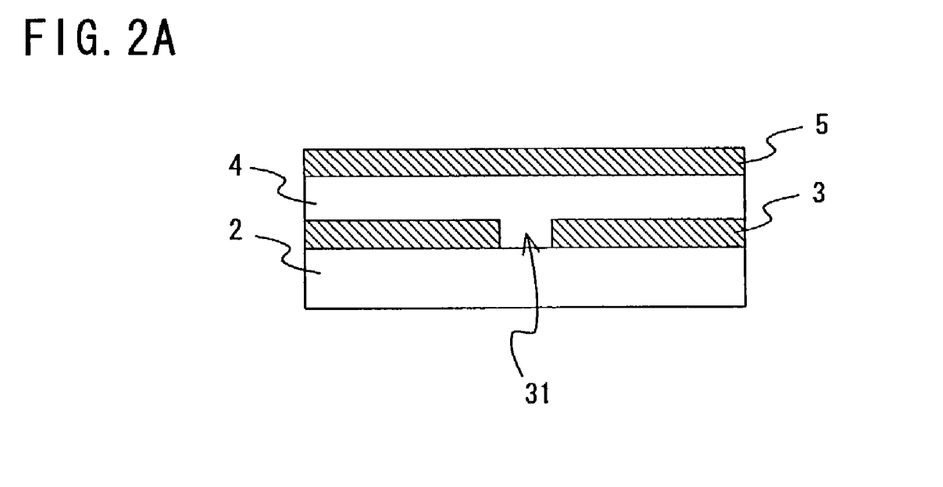
FIGS. 2A and 2B are sectional views of a pixel area of a liquid crystal display device according to the present invention.
Figure 2B:
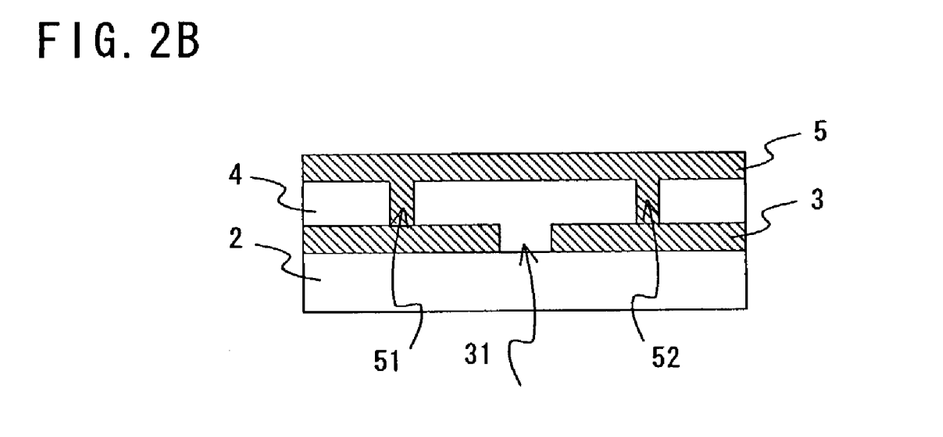

FIG. 2 shows a sectional view of the part where line disconnection occurs. As described above, the source line 3, the insulation layer 4, and the common electrode 5 are deposited on the insulation layer 2 in the TFT array substrate according to the present embodiment. The insulation layer 4 are deposited twice, for example, and each of the first and second layers has a thickness of 200 nm to 300 nm.

As shown in FIG. 2A, the source line 3 is disconnected at an area 31 in this case. When a laser beam is applied to melt metal in the areas 51 and 52 of the common electrode 5, dielectric breakdown occurs in the insulation layer 4 to conductively connect the common electrode with the source line 3, which results in the configuration shown in FIG. 2B. In the disconnected part of the source line 3, source signals are applied through a bypass route of a molten metal 51, the common electrode 5, and a molten metal 52.

Next, areas 531, 532, and 533 of the common electrode 5 in FIG. 1 are exposed to a laser beam by a laser. Then, the common electrode 5 is cut at the areas 531, 532, and 533. The areas 531, 532, and 533 serve as separating areas for line disconnection recovery. The area 531 separates an overlap portion of the source line 3 and the common electrode 5 between horizontally adjoining pixels from the laterally extending portion of the common electrode 5. The area 532 separates an overlap portion of the source line 3 and the common electrode 5 between horizontally adjoining pixels from the laterally extending portion of the common electrode 5 in the opposite side from the area 531. The area 533 separates an overlap portion of the source line 3 and the common electrode 5 between horizontally adjoining pixels from the portion of the common electrode 5 which extends laterally and is connected to the common capacitor line 7. This processing allows electrically disconnecting the portion of the common electrode 5 conductively connected with the source line 3 by the laser beam application to the areas 51 and 52 from the other portion of the common electrode 5 at least between which and the pixel electrode 6 is generated an electric field.

No conductive element such as the source electrode 3 is provided below the areas 531, 532, and 533 of the common electrode 5, that is, separating areas for line disconnection recovery. The laser beam application therefore does not cause conductive connection between the common electrode 5 and other conductive elements. It is preferable in the separating areas for line disconnection recovery that there is no other conductive element providing a different potential from the common electrode within 4 μm of the source line.

The laser beam can be the same or different in kind and intensity between the one applied to the areas 531, 532, and 533 of the common electrode 5, and the one applied to the areas 51 and 52. The laser beam applied to the areas 531, 532, and 533 can have lower intensity than that applied to the areas 51 and 52 does, for example.

Second Embodiment

Figure 3:
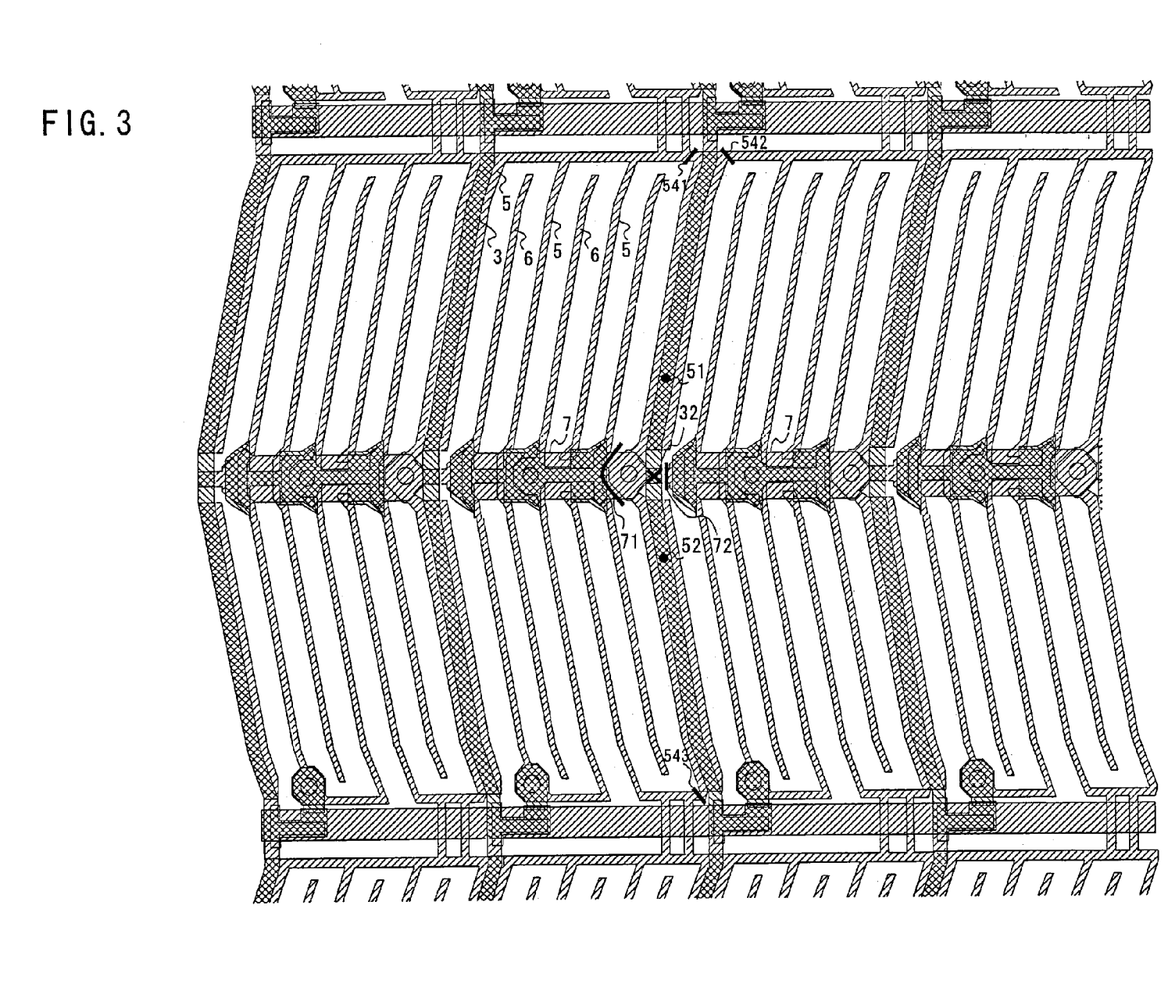
FIG. 3 is a view to show a pixel area of a liquid crystal display device according to the present invention.

FIG. 3 is an enlarged view of a plurality of pixel electrodes of the liquid crystal display device according to the present invention. The configuration shown in FIG. 3 is the same as that shown in FIG. 1, except a disconnected part of the source line 3.

The case where a source line 3 is disconnected at an area 32 in the configuration shown in FIG. 3 will be explained hereinbelow. The area 32 is located in such a position that the source line 3 between horizontally adjoining pixels is overlapped with the common electrode 5 in the middle part of a pixel. First, areas 51 and 52 of the common electrode are exposed to a laser beam from a laser at a side of the common electrode. The areas 51 and 52 are located in an overlap portion of the source line 3 and the common electrode 5 between horizontally adjoining pixels, and between those areas are the area 32. Metal in the areas 51 and 52 of the common electrode 5 are thereby molten, and dielectric breakdown occurs in the insulation layer 4 to conductively connect the common electrode with the source line 3. In the disconnected area of the source line 3, source signals are applied through a bypass route of a molten metal 51, the common electrode 5, and a molten metal 52.

Next, areas 541, 542, and 543 of the common electrode 5 in FIG. 3 are exposed to a laser beam by the laser. The area 541 separates an overlap portion of the source line 3 and the common electrode 5 between horizontally adjoining pixels from the laterally extending portion of the common electrode 5. The area 542 separates an overlap portion of the source line 3 and the common electrode 5 between horizontally adjoining pixels from the laterally extending portion of the common electrode 5 in the opposite side from the area 541. The area 543 separates an overlap portion of the source line 3 and the common electrode 5 between horizontally adjoining pixels from the portion of the common electrode 5 which extends laterally and also vertically crossing the gate line 1. The area 71 separates an overlap portion of the source line 3 and the common electrode 5 between horizontally adjoining pixels from the common capacitor line 7. Then, the common electrode 5 is cut at the areas 541, 542, and 543, and the common capacitor line 7 is cut at the areas 71 and 72. This processing allows electrically disconnecting the portion of the common electrode 5 conductively connected with the source line 3 by the laser beam application to the areas 51 and 52 from the other portion of the common electrode 5 and the common capacitor line 7. No conductive element such as the source electrode 3 is provided below the areas 541, 542, and 543 of the common electrode 5 and the area 71 of the common capacitor line. The laser beam application therefore does not cause conductive connection between the common electrode 5 and other conductive elements.

Third Embodiment

Figure 4:
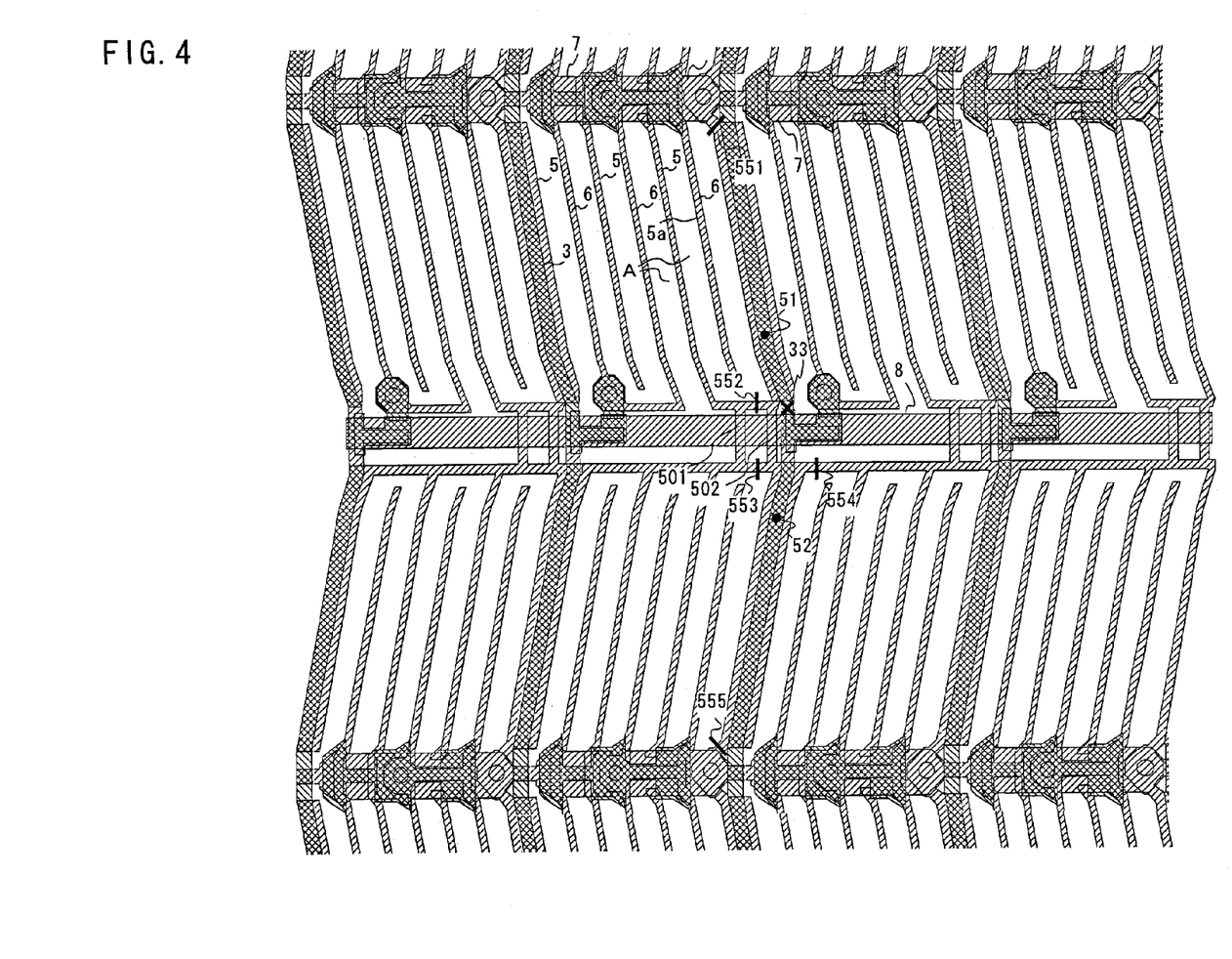
FIG. 4 is a view to show a pixel area of a liquid crystal display device according to the present invention.

FIG. 4 is an enlarged view of a plurality of pixel electrodes of the liquid crystal display device according to the present invention. The configuration shown in FIG. 4 is the same as that shown in FIG. 1, except a disconnected part of the source line 3.

The case where a source line 3 is disconnected at an area 33 in the configuration shown in FIG. 4 will be explained hereinafter. The area 33 is located in such a position that the source line 3 is overlapped with a semiconductor layer of the switching element. The area 33 is thus close to the switching element. First, areas 51 and 52 of the common electrode are exposed to a laser beam from a laser at a side of the common electrode. The areas 51 and 52 are located in an overlap portion of the source line 3 and the common electrode 5 between horizontally adjoining pixels, and between those areas are the area 33. Metal in the areas 51 and 52 of the common electrode 5 are thereby molten, and dielectric breakdown occurs in the insulation layer 4 to conductively connect the common electrode with the source line 3. In the disconnected area of the source line 3, source signals are applied through a bypass route of a molten metal 51, the common electrode 5, and a molten metal 52.

Next, areas 551, 552, 553, 554, and 555 of the common electrode 5 in FIG. 4 are exposed to a laser beam. The area 551 separates an overlap portion of the source line 3 and the common electrode 5 between horizontally adjoining pixels from the common electrode 5 connected to the common capacitor 7. The area 552 separates an overlap portion of the source line 3 and the common electrode 5 between horizontally adjoining pixels from the other portion of the common electrode 5. The area 553 separates an overlap portion of the source line 3 and the common electrode 5 between horizontally adjoining pixels from the other portion of the common electrode 5. The area 554 separates an overlap portion of the source line 3 and the common electrode 5 between horizontally adjoining pixels from the common electrode 5 in the opposite side from the area 553. The area 555 separates the common electrode 5 having the area 52 from the other portion of the common electrode 5. Then, the common electrode 5 is cut at the areas 551 to 555. This processing allows electrically disconnecting the portion of the common electrode 5 conductively connected with the source line 3 by the laser beam application to the areas 51 and 52 from the other portion of the common electrode. No conductive element such as the source electrode 3 is provided below the areas 551 to 555 of the common electrode 5. The laser beam application therefore does not cause conductive connection between the common electrode 5 and other conductive elements.

In this embodiment, two pieces of electrode patterns 501 and 502 are provided to connect the common electrode 5 located between pixels adjoining vertically in a direction perpendicular to an electric field between the common electrode 5 and the pixel electrode 6, with the gate line 1 placed therebetween. The areas 552 and 553, which are to be cut by a laser beam, are located at the common electrode 5 between the electrode patterns 501 and 502 . In this configuration, even if the common electrode 5 is cut at the areas 552 and 553, the electrode pattern 501 allows connection to be kept between the common electrode 5 placed between vertically adjoining pixels. The area A shown in FIG. 4 therefore does not turn to a defect area.

Though two pieces of the electrode patterns 501 and 502 are formed in the above embodiment, more than two pieces of electrode patterns can be provided.

Although the above embodiment explains the case where the source line 3, the common electrode 5, and the pixel electrode 6 are bent once at their middle, more than one bend or no bend is also possible. It is also possible that the pixel electrode 6 and the common electrode 5 are bent while the source line 3 is not.

In the following, a manufacturing flowchart of the liquid crystal display device according to the first to third embodiments of the present invention will be explained with reference to FIG. 5.

Figure 5A:
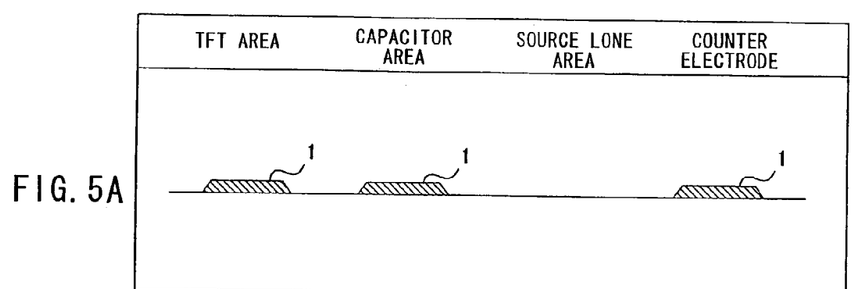
Figure 5B:
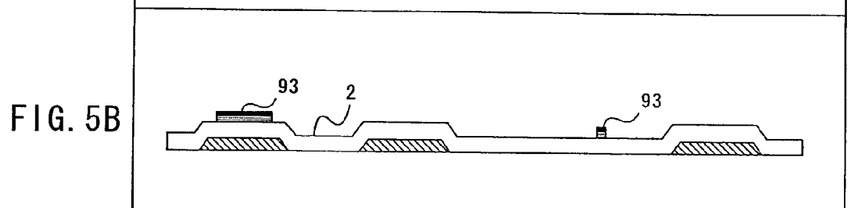

First, as shown in FIG. 5A, Cr, Al, Ti, Ta, Mo, W, Ni, Cu, Au, Ag, or an alloy comprised mainly of those, a conductive film transmitting light such as Indium Tin Oxide (ITO), or a multi-layer film of those is deposited on an insulating substrate by sputtering or vapor deposition. A gate line 1, a gate electrode 1, and a common capacitor line are then formed by a photolithography process. Next, as shown in FIG. 5B, a gate insulation film 2 of silicon nitride or the like is deposited. Further, a semiconductor layer 93 of amorphous silicon (a-Si), polysilicon (poly-Si), ortho like, and, in a N-type TFT, a contact layer of $n^+$a-Si, $n^+$poly-Si, or the like, which is highly doped with impurity such as P, are successively deposited by plasma chemical vapor deposition (CVD), atmospheric pressure CVD, or low-pressure CVD, for example. Then, the contact layer and the semiconductor layer 93 are formed to be island-shaped.

Figure 5C:
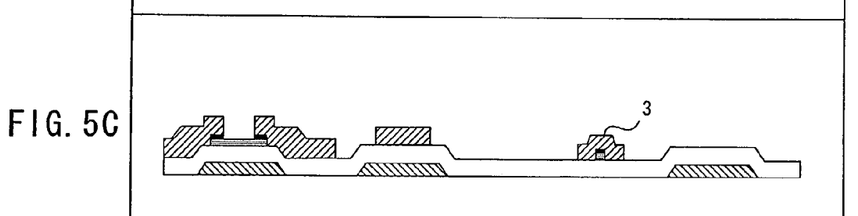

In the second place, as shown in FIG. 5C, Cr, Al, Ti, Ta, Mo, W, Ni, Cu, Au, Ag, or an alloy comprised mainly of those, a conductive film transmitting light such as ITO, or a multi-layer film of those is deposited by sputtering or vapor deposition. A source line 3, a source electrode, a drain electrode, and storage capacitor electrode are then formed by a photolithography process and microfabrication technique. Then, the contact layer is etched away from a channel region, using the source electrode and the drain electrode, or a photoresist used for forming those, as an etch mask.

Figure 5D:
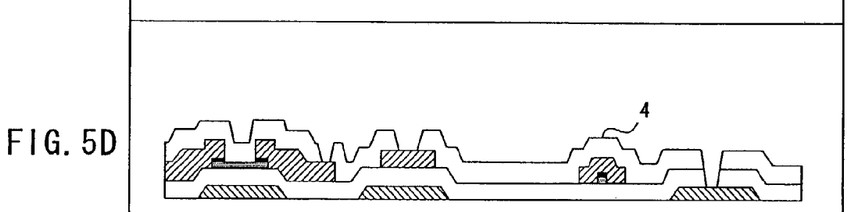

In the third place, as shown in FIG. 5D, an insulation film 4 of silicon nitride, silicon oxide, inorganic insulation film, or organic resin is deposited. Two layers of the insulation film 4, the first insulation film 4a and the second insulation film 4b, are formed by two times of film deposition processes as explained above with reference to FIG. 3. Then, a contact hole is formed by a photolithography process and a subsequent etching process.

Figure 5E:
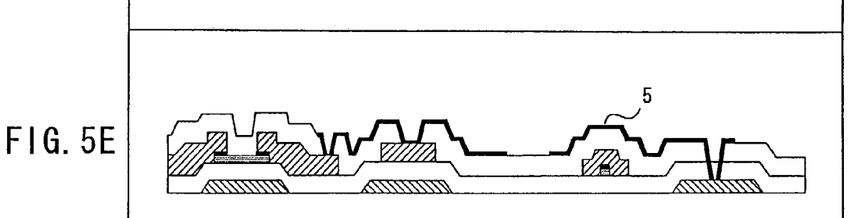

Finally, as shown in FIG. 5E, Cr, Al, Ti, Ta, Mo, W, Ni, Cu, Au, Ag, or an alloy comprised mainly of those, a conductive film transmitting light such as ITO, or a multi-layer film of those is deposited, and then patterned to form a pixel electrode and a counter electrode 5.

The processes explained above produces a TFT substrate constituting an In-Plane Switching mode liquid crystal display device. Liquid crystal is filled between the TFT substrate and an opposite substrate, and the two substrates are joined with an adhesive seal material. Here, liquid crystal molecules are aligned at a certain angle by rubbing, photo-alignment, or any other known method. Then, a gate line drive circuit, a source line drive circuit, and a common capacitor line power source are connected, respectively, to the gate line, the source line, and the common capacitor line, thereby producing a liquid crystal display device.

Although the above embodiment explains the case where the step of conductively connecting the source line with the common electrode precedes the step of separating a part of the common electrode, the steps can be in reverse order.

As explained in the foregoing, the present invention provides a liquid crystal display device in which disconnection in a source line is easily recovered, and a manufacturing method thereof.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device having a common electrode, the common electrode comprising:
    an overlapping portion in which the common electrode is overlapped with a source line; and
    separating areas for line disconnection recovery arranged outside of the overlap portion, the separating areas disconnecting the overlap portion from the common electrode,
    wherein an electric field is generated between a pixel electrode and other portions of the common electrode, the other portions not including the overlap portion, and the separating areas for line disconnection recovery are not overlapped with other conductive elements, including the source line, and have no other conductive element within 4 $\mu$m of the source line.

2. A liquid crystal display device according to claim 1, wherein a plurality of electrode patterns are provided to connect the common electrode in the overlap portion with the common electrode in an adjoining pixel.

3. A liquid crystal display device according to claim 2, wherein the plurality of electrode patterns are formed in a pixel.

4. A liquid crystal display device according to claim 2, wherein the plurality of electrode patterns extend from the common electrode.

5. A liquid crystal display device having a common electrode, the common electrode comprising:
    an overlap portion in which the common electrode is overlapped with a source line; and
    no more than three separating areas for source line recovery arranged outside of the overlap portion, the no more than three separating areas being configured to permit complete disconnection of the overlap portion from the common electrode,
    wherein an electric field is generated between a pixel electrode and other portions of the common electrode, the other portions not including the overlap portion.

6. A liquid crystal display device according to claim 5, wherein a common capacitor line connected to the common electrode comprises separating areas for line disconnection recovery disconnecting the overlap portion from one of the other portions of the common electrode.

7. A liquid crystal display device according to claim 5, wherein the separating areas for line disconnection recovery are not overlapped with other conductive elements, including the source line.

8. A liquid crystal display device according to claim 5, wherein a plurality of electrode patterns are provided to connect the common electrode in the overlap portion with another common electrode in an adjoining pixel.

9. A liquid crystal display device according to claim 8, wherein the plurality of electrode patterns are formed in a pixel.

10. A liquid crystal display device according to claim 8, wherein the plurality of electrode patterns extend from the common electrode.

* * * * *